United States Patent [19]

Hakaridani et al.

[11] Patent Number: 4,596,031
[45] Date of Patent: Jun. 17, 1986

[54] METHOD OF SPEECH RECOGNITION

[75] Inventors: Mitsuhiro Hakaridani, Nara; Yoshiki Nishioka, Tenri; Hiroyuki Iwahashi, Nara, all of Japan

[73] Assignee: Sharp Kabushiki Kaisha, Osaka, Japan

[21] Appl. No.: 451,937

[22] Filed: Dec. 21, 1982

[30] Foreign Application Priority Data

Dec. 28, 1981 [JP] Japan ............................ 56-214175

[51] Int. Cl.[4] .............................................. G10L 1/00
[52] U.S. Cl. ................................. 381/43; 364/513.5
[58] Field of Search ................ 381/42, 43; 364/513, 364/513.5

[56] References Cited

PUBLICATIONS

Myers and Rabiner, "A Level Building Dynamic Time Warping Algorithm", *IEEE Trans. Acoustics*, Apr. 1981, pp. 284–297.

Primary Examiner—E. S. Matt Kemeny
Attorney, Agent, or Firm—Birch, Stewart, Kolasch & Birch

[57] ABSTRACT

In a speech recognition system, similarity calculations between speech feature patterns are reduced by stopping similarity calculations for any one reference pattern when a frame in the pattern fails to exceed a corresponding similarity threshold.

2 Claims, 3 Drawing Figures

METHOD OF SPEECH RECOGNITION

BACKGROUND OF THE INVENTION

This invention is related to a speech recongnition system in which the degree of similarity between the feature pattern of the speech to be recognized and the feature patterns of a number of speech types initially recorded are calculated and speech recognition is adjudged.

In a conventional speech recognition system, the degree of similarity between speech patterns is calculated by comparing the feature pattern of the speech to be recognized and the feature patterns of a number of prerecorded speech types, calculating the various degrees of similarities, and then the prerecorded feature patterns with the greatest degree of similarity are designated as the recognition result. In this type of speech recognition system, similarities are calculated over all of the prerecorded feature pattern frames those of the feature pattern of the speech that is recognized and the frames of the not-so-similar prerecorded feature patterns. These systems therefore had the disadvantages of excessive wasteful calculations, poor recognition efficiency, and long processing time.

OBJECT AND SUMMARY OF THE INVENTION

The main object of this invention is to offer a speech recognition system which resolves the above mentioned disadvantages.

A summary of this invention is as follows: A threshold value based on the similarities detected upon comparison of the test pattern with prerecorded patterns is obtained and, when a comparison operation results in less similarity than the threshold value during the similarity calculation process of the various feature patterns, no further similarities will be calculated for that prerecorded feature pattern. Wasteful calculations will therefore be eliminated thus improving processing speed.

BRIEF DESCRIPTION OF THE INVENTION

The present invention will be better understood from the detailed description given hereinbelow and the accompanying drawings which are given by way of illustration only, and thus do not limit the present invention wherein.

DETAILED DESCRIPTION OF THE INVENTION

Figure 1:
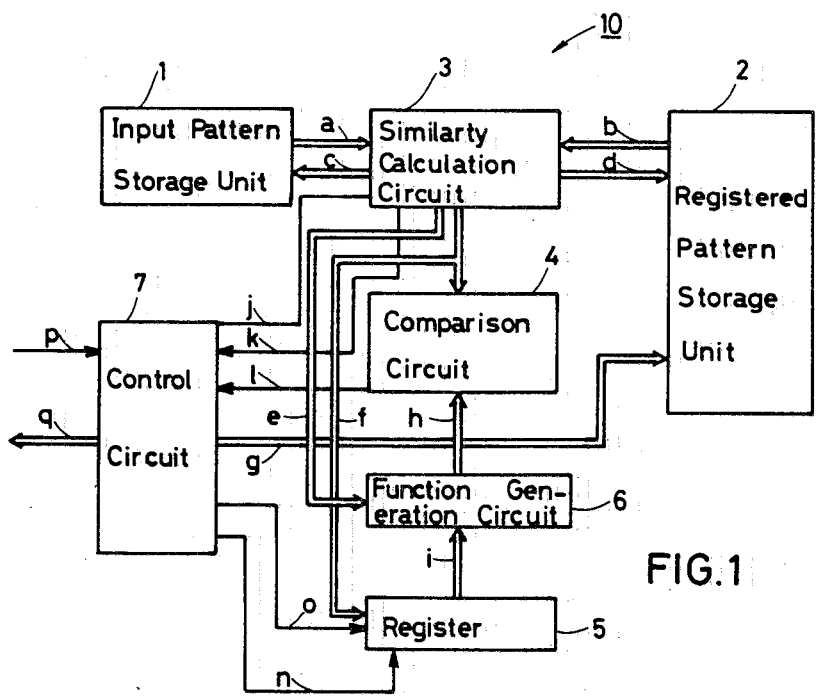
FIG. 1 is a block diagram of an embodiment of the present invention.

FIG. 1 is a block diagram of an embodiment of the present invention. A speech recognition unit 10 comprises an input pattern storage unit 1 in which the feature patterns of the speech to be recognized are stored and a registered pattern storage unit 2 in which the feature patterns of a number of prerecorded speech types are stored. The speech recognition unit 10 also includes a similarity calculation circuit 3. The similarity calculation circuit 3 reads out the feature patterns stored in the input pattern storage unit 1 and the feature patterns stored in the registered pattern storage unit 2 in successive order per frame and calculates the degrees of similarities. The calculation results of similarity calculation circuit 3 are fed to a comparison circuit 4 and a register 5. A control circuit 7 controls write-in of the register 5 so it will always memorize the highest similarity value (that is, the similarity that indicates the closest resemblance) of those calculated throughout all of the frames. The similarity values memorized in the register 5 are then fed to a function generation circuit 6. The function generation circuit 6 generates specified threshold values (limit functions) that are based on the similarity values from the register 5 and feeds these to the comparison circuit 4. The comparison circuit 4 compares the similarity values from the similarity calculation circuit 3 with the limit functions from the function generation circuit 6 in successive order per frame and feeds the comparison results to a control circuit 7. The control circuit 7 is provided to operate in conjunction with the registered pattern storage unit 2, the similarity calculation circuit 3, the comparison circuit 4 and the register 5.

Figure 2:
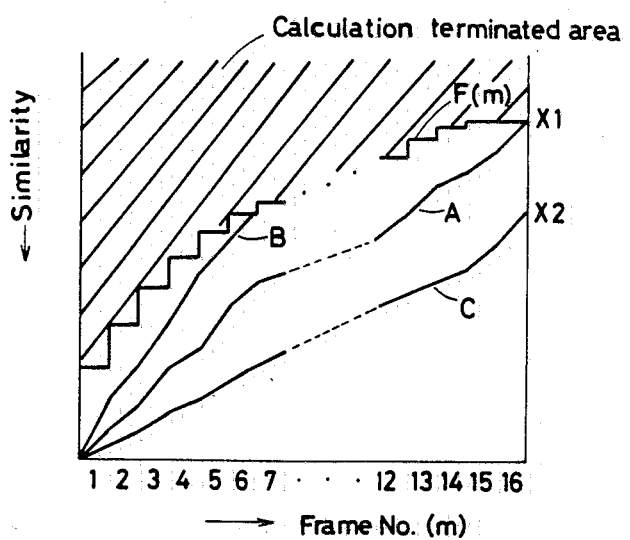
FIG. 2 is an explanatory diagram giving a rough outline of the operation of the embodiment of the present invention in FIG. 1.

FIG. 2 is an explanatory diagram giving a rough outline of the operation of speech recognition unit 10 shown in FIG. 1. A rough outline of the operation of speech recognition unit 10 is given as follows while making reference to FIG. 2:

To simplify explanations, the input feature patterns and registered feature patterns are both composed of 16 frame feature spectrums of the same time span and by setting each feature spectrum as $a_e = (a_{e1}, a_{e2}, \ldots, a_{en})$ the similarity value of frame No. 1 can be expressed by $$s_e = \sum_{i=1}^{n} (\vec{a_{ei}IN} - \vec{a_{ei}REF})^2.$$

In this instance, various types of functions may also be considered as being generated in in the function generation circuit 6 such as, for example, the following:

$$F(m) = \min(D \cdot (\tfrac{1}{2} + m/16), D) \text{ or}$$

$$F(m) = \min(D \cdot (\tfrac{1}{2} + \sqrt{m/4}), D)$$

where "m" is the frame number. A similarity value D is the highest similarity value (will be set in register 5) of the similarity values calculated up to the final frame. The similarity calculation circuit 3 calculates the degree of similarity between the input feature patterns and registered feature patterns under the aforementioned conditions in successive frame order and, moreover, accumulatively. The transitions in degree of similarity by frame during this calculation process are shown in FIG. 2 (curves A, B and C). Although similarity values will be calculated by frame here, the values obtained for each frame will be on a cumulative basis. As the similarity value therefore becomes smaller as the calculation per frame progresses, the similarity value accumulated in the final 16th frame will represent the overall similarity value of that feature pattern.

If we take curve A for instance, the overall degree of similarity of this feature pattern will be X1. Now, if this similarity value X1 happens to be the highest of the overall similarity values obtained, similarity value X1 will be set in the register 5. The function generation circuit 6 will then generate a limit function F(m) explained above based on similarity value X1. The limit function F(m) forecasts transitions in similarity values for each frame and, as shown in FIG. 2, it is a stepped type limit function in which the values differ per frame. Limit functions F(m) obtained in this way are used as the threshold value to determine whether to continue with similarity value calculations. For example, in the similarity value calculation indicated by curve B, the similarity value in the 6th frame will become smaller than the limit function F(m). In this instance, the probability is extremely small that the overall degree of similarity of curve B will become greater than overall similarity X1 of curve A even if similarities are calculated to the final 16th frame. For this reason, the similarity calculations of curve B will be terminated at the 6th frame and thus eliminate wasteful calculations.

If the similarity values obtained during the calculation process are always greater than the limit function F(m), such as in the similarity calculations in curve C, similarities will be calculated to the final, 16th, frame. Overall similarity value X2 that is obtained will be greater than overall similarity value X1 in curve A. For this reason, the contents of register 5 will be rewritten to this similarity value X2 and the function generation circuit 6 will generate limit functions based on the similarity value X2.

The above mentioned action will be repeated and, after calculating similarities of all of the registered feature patterns, the largest similarity value will be set in the register 5. In accordance with this, the control circuit 7 will be memorizing the corresponding registered feature pattern addresses and will output these addresses as the recognition results.

Figure 3:
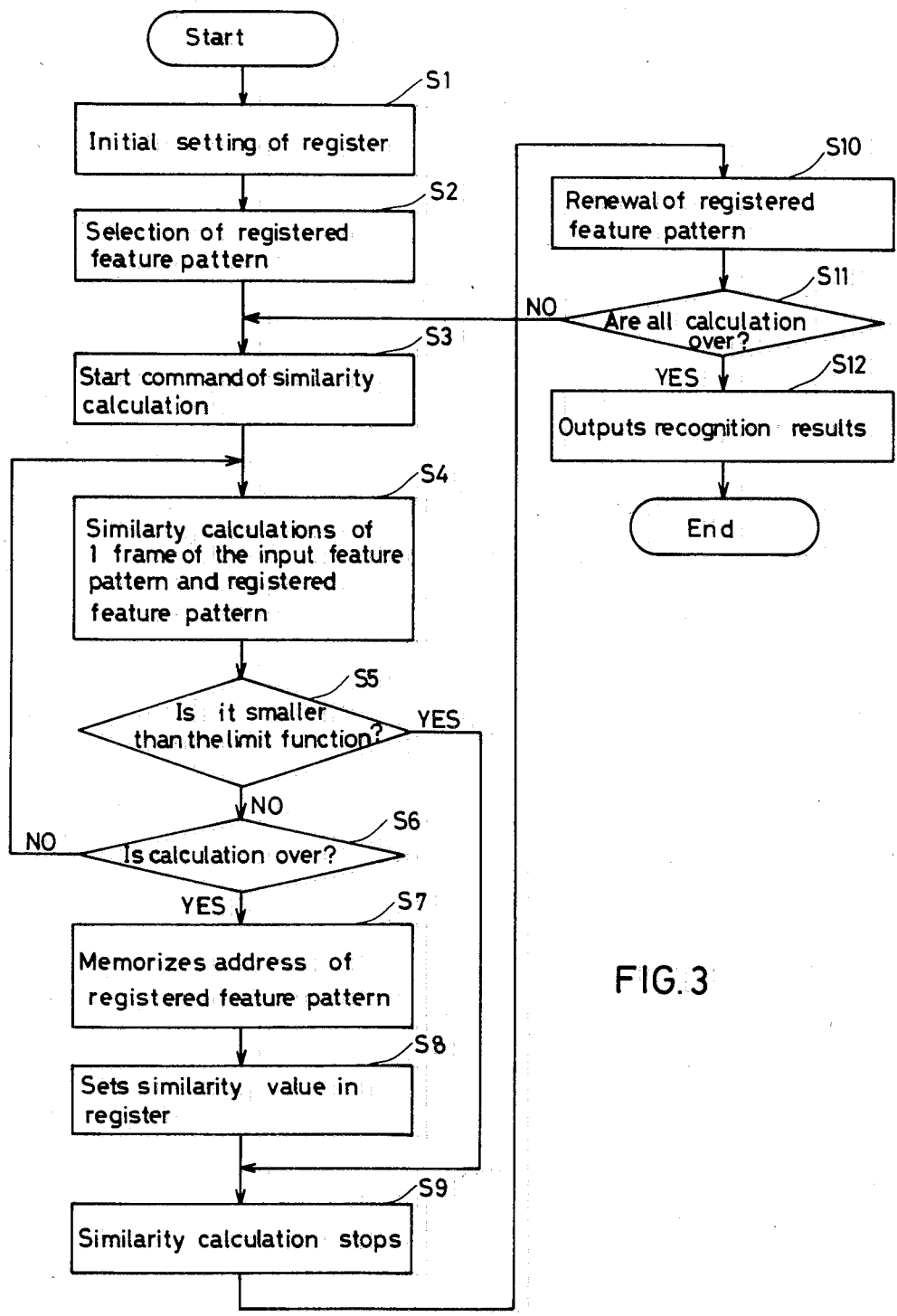
FIG. 3 is a flow chart showing the operation of the embodiment of the present invention.

FIG. 3 is a flow chart which explains the operation of the embodiment of the present invention of FIG. 1. A more detailed explanation of the operation of the embodiment of the present invention in FIG. 1 will be given as follows while making reference to FIGS. 1 and 3:

First, a recognition start command signal p is fed to the control circuit 7 to commence the recognition operation. In other words, in step 1 (abbreviated as S1 in the diagram), the control circuit 7 initially sets the register 5 using initial set signal "n". The smallest similarity value (similarity value that indicates the least resemblance) will then be set in the register 5 with this initial setting. Next, in step 2, the control circuit 7 will set the address in the registered pattern storage unit 2 using address data "g" and will select the registered feature pattern for which similarities are to be calculated. In step 3, the control circuit 7 feeds similarity calculation start signal "j" to the similarity calculation circuit 3 and instructs commencement of similarity calculations. In step 4, the similarity calculation circuit 3 calculates the similarity value between the input feature pattern and the registered feature pattern in one frame, that is, the similarity calculation circuit 3 feeds frame No. setting data "c" and "d" to the input pattern storage unit 1 and the registered pattern storage unit 2 respectively. The input pattern storage unit 1 feeds feature pattern data that corresponds to the frame, "a" to the similarity calculation circuit 3. In the same manner, the registered pattern storage Unit 2 feeds to the similarity calculation circuit, 3, the feature pattern data "b" of the frame corresponding to the registered feature pattern selected by the control circuit 7. The similarity calculation circuit 3 calculates the similarity value of the frame received. A calculated similarity value "f" is then fed to the comparison circuit 4 and the register 5.

At this time, the similarity calculation circuit 3 will also feed frame data No. setting data "e" to the function generator circuit 6. Based on similarity data "i" received from the register 5 and frame setting data "e" received from the similarity calculation circuit 3, the function generation circuit 6 generates limit function value "h" for this frame and feeds this to the comparison circuit 4. The comparison circuit 4 compares similarity data "f" from the similarity calculation circuit 3 with limit function value "h" from the function generation circuit 6 and, when limit function value "h" becomes larger than similarity data "f", generates signal "1" and feeds this to the control circuit 7. In step 5, the control circuit 7 judges whether there is a signal and then judges whether similarity data "f" has become smaller than limit function value "h". If similarity data "f" is greater than limit function value "h", in step 6, the control circuit 7 will judge whether similarity calculations have been completed for all frames. This judgement will be based on the existence of complete signal "k" output from the similarity calculation circuit 3 when similarity calculations have been completed for all frames. In other words, if complete signal "k" is not supplied to the control circuit 7 from the similarity calculation circuit 3, the operation in step 4 or step 6 will be repeated. At this time, the similarity calculation circuit 3 renews frame No. setting data "c", "d" and "e" in successive order and, after calculating similarities in that frame, accumulates this with the similarity values calculated in the frames up to that time.

When complete signal "k" is fed to the control circuit 7 from the similarity calculation circuit 3, the control circuit 7 will judge that similarity calculations have been completed for all frames and, in step 7, will memorize the address of the registered feature pattern at that time. In addition, in step 8, the control circuit 7 will feed rewrite signal "O" to the register 5 and reset the similarity value set in the register 5 with the overall similarity value of the registered feature pattern obtained at that time. Next, in step 9, the control circuit 7 outputs similarity calculation stop command signal "j" to the similarity calculation circuit 3. In response to this, the similarity calculation circuit 3 stops calculating similarities.

Next, in step 10, the control circuit 7 renews an address data "g" and selects the next registered feature pattern in the registered storage unit 2. In step 11, the control circuit 7 judges whether similarity calculations have been completed for all registered feature patterns in the registered pattern storage unit 2. If similarity calculations have not been completed for all registered feature patterns, the operations in steps 3 to 11 will be repeated.

Now we shall explain the action involved when the similarity data "f" becomes smaller than the limit function value "h" in step 5 previously mentioned. In this instance, similarity calculations will stop immediately in step 9. In other words, similarity calculations will be terminated as shown by curve B in FIG. 2.

The action in steps 3 to 11 will be repeated as explained above and, when similarity calculations have been completed on all registered feature patterns, the control circuit 7 will, in step 12, output address "q" of the registered feature pattern set in the register 5 as recongnition results.

Although it was explained in the foregoing that, in the practical example, the similarity calculation circuit 3 would calculate the similarity value (e.g. Euclid distance) of the input feature pattern and the registered feature pattern in the same frame, it can also calculate similarities between optimum frames such as in DP matching, or calculate similarities by some other matching method.

As explained in the foregoing, when a certain specified condition based on the threshold value and similarity calculations is reached in the similarity calculation process of the feature pattern, this invention eliminates the need to calculate further similarities for that prerecorded feature pattern. This results in a great reduction in of the volume of similarity calculations required without decreasing recognition performance. This, therefore, leads to improvements in recognition speed.

The invention being thus described, it will be obvious that the same may be varied in many ways. Such variations are not regarded as a departure from the spirit and scope of the invention, and all such modifications are intended to be included within the scope of the following claims.

What is claimed is:

1. In a speech recognition system for successively judging the similarities between test patterns of speech and a plurality of stored feature patterns of speech, and identifying which of said stored feature patterns is most similar to said test pattern, said test patterns and feature patterns being divisible into corresponding frames of information, the improvement comprising:

(a) input means for introducing a test pattern into said system;
    (b) memory means for storing said plurality of feature patterns;
    (c) judging means for sequentially accessing said stored feature patterns in said memory means and calculating similarity values between said corresponding frames of said test patterns and each of the feature patterns;
    (d) function generator means for developing a threshold similarity pattern having threshold similarity values for each of the said corresponding frames, said threshold similarity values having predetermined initial values;
    (e) comparator means for comparing the similarity values calculated by said judging means with the threshold similarity values of the threshold similarity pattern, and generating a stop signal when any similarity value of a given corresponding frame is less than a threshold similarity value for that frame;
    (f) control means responsive to said stop signal for precluding said judging means from calculating any further similarity values for the frames of the feature pattern then being judged and causing said judging means to access and calculate similarity values for another stored feature pattern in said memory means; and
    (g) identification means for identifying which of said feature patterns, the calculated similarity values of which as compared to the test pattern have no frames with similarity values less than said threshold values, is the most similar to said test pattern.

2. The speech recognition system of claim 1 wherein said function generator means includes means for changing the threshold similarity values from said initial values to the highest similarity values calculated for a previously judged, stored feature pattern, to thereby enable said identification means to successively eliminate stored feature patterns having calculated similarity values lower than the changed threshold values from identification as a most similar feature pattern.

* * * * *